United States Patent [19]
Walker

[11] Patent Number: 5,400,695
[45] Date of Patent: Mar. 28, 1995

[54] METHOD AND DEVICE FOR LOCKING CYLINDRICAL MEMBERS TOGETHER

[75] Inventor: Jimmie K. Walker, Sioux City, Iowa

[73] Assignee: Prince Manufacturing Corporation, Sioux City, Iowa

[21] Appl. No.: 207,839

[22] Filed: Mar. 8, 1994

[51] Int. Cl.6 .............................................. F01B 29/00
[52] U.S. Cl. ........................................ 92/128; 92/53; 92/51
[58] Field of Search ..................... 92/51, 52, 53, 128, 92/169.1

[56] References Cited
U.S. PATENT DOCUMENTS

| | | | |
|---|---|---|---|
| 2,677,933 | 5/1954 | Hopkinson | 92/169.1 |
| 3,136,230 | 6/1964 | Buckley | 92/128 |
| 3,881,401 | 5/1975 | Bimba | 92/169.1 |
| 4,192,225 | 3/1988 | Moyer | 92/169.1 |
| 4,771,678 | 9/1988 | Walker | |
| 5,245,911 | 9/1993 | Yuda | 92/128 |
| 5,263,402 | 11/1993 | Gottlieb | 92/53 |

Primary Examiner—Thomas E. Denion
Attorney, Agent, or Firm—Zarley, McKee, Thomte, Voorhees & Sease

[57] ABSTRACT

The wire lock is provided for holding a stop ring on the outer surface of a cylinder. The stop ring includes a counterbore at one end thereof. The counterbore is positioned above an annular groove in the outer circumference of the cylinder. The wire lock is inserted into the registered counterbore and annular groove so as to prevent the stop ring from moving axially on the outer surface of the cylinder. The wire lock is accessible and visible from one axial end of the stop ring.

3 Claims, 3 Drawing Sheets

METHOD AND DEVICE FOR LOCKING CYLINDRICAL MEMBERS TOGETHER

BACKGROUND OF THE INVENTION

This invention relates to a method and device for locking cylindrical members together. Specifically it relates to a method and means for locking an annular ring to the outside surface of a cylindrical member.

An example of a locking device for locking cylindrical members together is shown in U.S. Pat. No. 4,771,678. This patent shows the use of a wire which can be drawn into two complementary grooves between a hydraulic piston and the piston shaft on which it is mounted. One of the two annular grooves is located on the inner diameter of the piston and the other is located on the outer diameter of the shaft. The wire lock is drawn between these two complementary grooves and locks the piston against axial movement on the piston shaft.

Therefore a primary object of the present invention is the provision of an improved method and device for locking cylindrical members together.

A further object of the present invention is the provision of a device for locking cylindrical members together which utilizes a wire lock which is accessible and visible from one axial end of the outer cylindrical member.

A further object of the present invention is the provision of an improved method and device for locking cylindrical members together which can be utilized for attaching stop rings to the outer surfaces of a plurality of telescoped cylinders.

A further object of the present invention is the provision of an improved method and device for locking cylindrical members together which makes the assembly and disassembly of hydraulic cylinders more simple and quicker than prior devices.

A further object of the present invention is the provision of an improved method and device for locking cylindrical members together which is economical to manufacture, durable in use, and efficient in operation.

SUMMARY OF THE INVENTION

The foregoing objects are achieved by a combination of an elongated inner cylindrical member having first and second axially spaced apart annular grooves formed on the outer surface thereof. The first groove has a wire hole formed therein and extending radially inwardly into the inner cylindrical member.

A retaining ring is fitted within the second groove and includes an outer circumferential portion protruding outwardly in a radial manner beyond the cylindrical surface of the inner cylindrical member. An outer cylindrical member is slideably fitted over the outer cylindrical surface of the inner cylindrical member and abuts against the retaining ring fitted within the second groove of the inner cylindrical member. The other axial end of the outer cylindrical member includes a counterbore formed therein, and the counterbore is positioned above the second annular groove in the inner cylindrical member. Fitted within the counterbore and extending into the second annular groove is a wire lock which holds the outer cylindrical member against axial movement away from the retaining ring.

To assemble the device, the retaining ring is first fitted within the second annular groove. Then the outer cylindrical member is placed over the inner cylindrical member and is moved to an abutting engagement with the retaining ring. Next, one end of a wire lock is inserted through a slot in the outer cylindrical member and downwardly into a wire hole formed in the second annular groove of the inner cylindrical member. Next, the outer cylindrical member is rotated relative to the inner cylindrical member, and this relative rotation causes the wire lock to be drawn into the annular groove of the inner cylindrical member and the counterbore of the outer cylindrical member.

DETAILED DESCRIPTION OF THE PREFERRED EMBODIMENT

Figure 1:
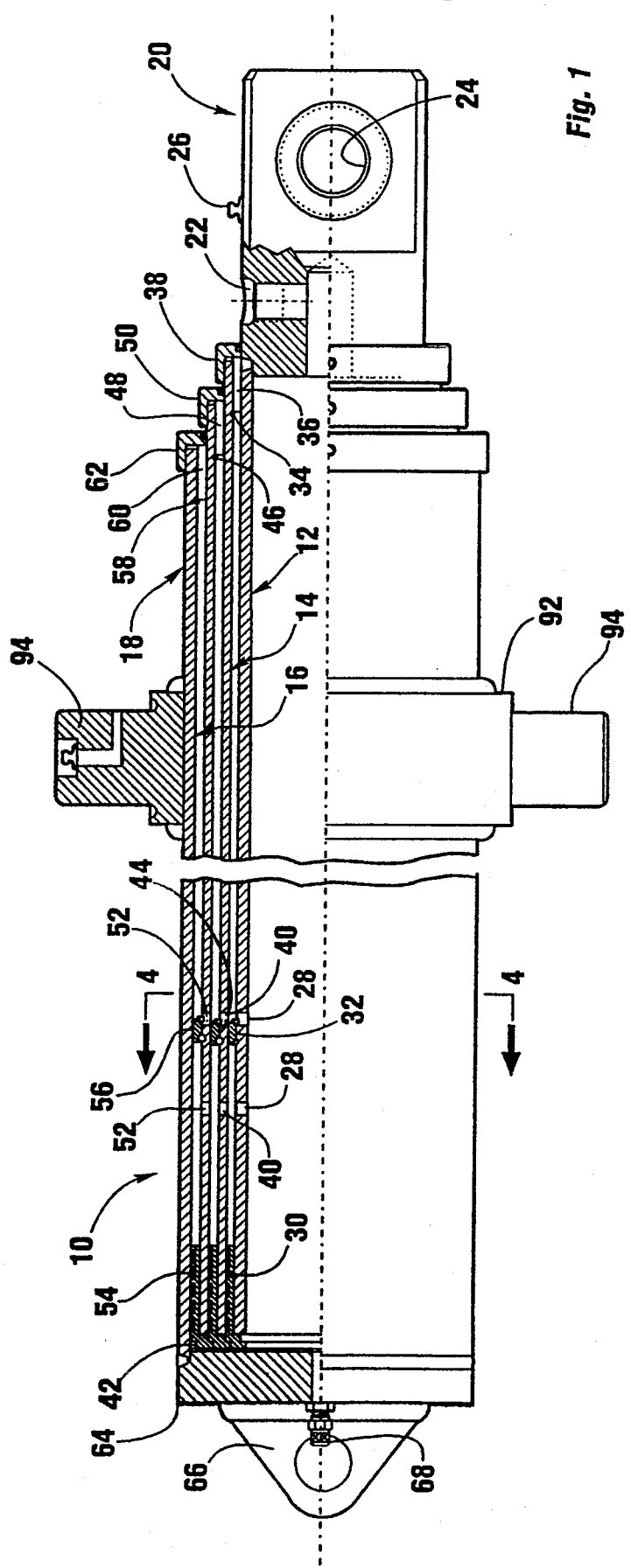
FIG. 1 is an elevational view shown partially in section of a three stage telescoped hydraulic cylinder.

Referring to the drawings the numeral 10 generally designates a telescopic hydraulic cylinder assembly having a first or inner cylinder 12, a second cylinder 14, a third cylinder 16, and a fourth or outer cylinder 18 all telescopically received within one another, the first or inner cylinder 12 being on the inside and the fourth or outer cylinder 18 being on the outside.

First cylinder 12 is provided with an end piece 20 having a hydraulic opening 22 for receiving a hydraulic coupling. Opening 22 provides communication into the interior of the first cylinder 12. A circular bushing 24 is also provided in end piece 20 for permitting the end piece to be connected to a mechanical implement. A grease for zerk 26 or fitting is also provided for supplying lubrication to the circular bushing 24. First cylinder 12 is provided with a pair of oil communication holes 28 located in its walls for permitting a limited amount of oil to communicate between the interior and the exterior of first cylinder 12.

The inner end of first cylinder 12 is open and includes on its exterior cylindrical surface a plurality of bearing rings 30 which bear against the interior of the second cylinder 14. Also mounted on the exterior surface of first cylinder 12 is a stop ring 32 which is adapted to engage a packing ring 34 for limiting the outward extensive movement of inner cylinder 12. Located externally of the packing ring 34 is a packing 36 which is held in place by means of a threaded end cap 38 which surrounds the exterior of inner cylinder 12 and permits first cylinder 12 to extend an retract therein.

Second cylinder 14 is provided with oil holes 40 in its wall, with bearing rings 42, a stop ring 44, a packing ring 46, a packing 48 and an end cap 50 all of which are similar in construction to those components shown for the inner cylinder 12.

The third cylinder 16 includes oil holes 52, bearing rings 54, a stop ring 56, a packing ring 58, packing 60 and an end cap 62. The end cap 62 is threadably mounted over the fourth and exterior cylinder 18. The other end of the cylinder 18 is provided with an end gland 64 having a clevis 66 and a hydraulic coupling 68 thereon.

Figure 2:
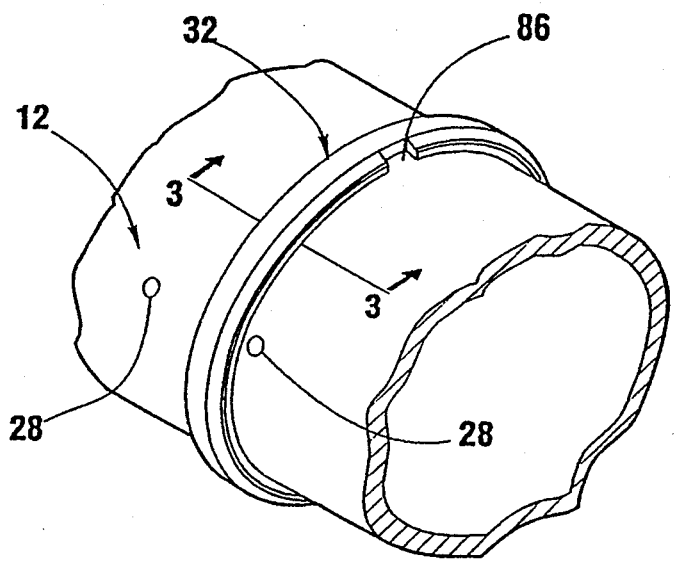
FIG. 2 is an enlarged detailed perspective view of one of the cylinders having a stop ring mounted there around.
Figure 3:
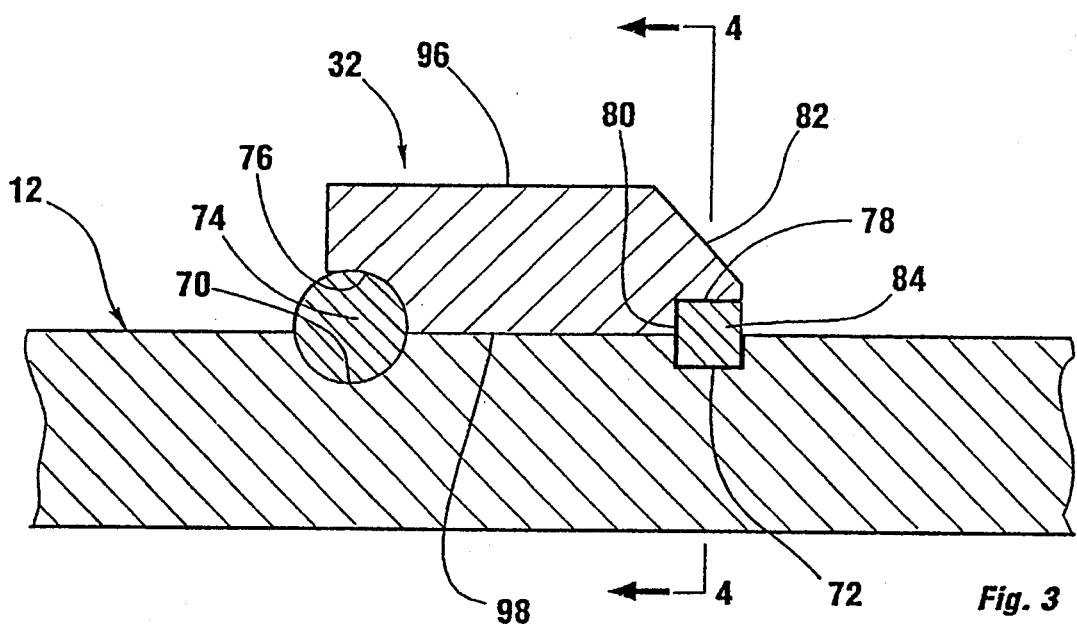
FIG. 3 is an enlarged detailed sectional view taken along line 3—3 of FIG. 2.

The mounting of the stop ring 32 on the exterior of inner tube 12 is shown in detail in FIGS. 2 and 3. A first groove 70 and a second groove 72 are provided in the exterior surface of first cylinder 12. In FIG. 3 the first groove 70 is shown to be semicircular in cross-section and the second groove 72 is shown to be rectangular in crosssection. However, the cross-sectional configurations of these grooves can be changed without detracting from the invention. This is particularly true of the second grooves 72 which can be circular or rectangular in cross-section.

Fitted within first groove 70 is a retaining snap ring 74 which is of sufficient diameter to protrude radially outwardly beyond the outer cylindrical surface of cylinder 12. One axial end of stop ring 32 is provided with an annular ring seating groove 76 sized to accommodate and abut against the retaining snap ring 74 as shown in FIG. 3. This limits the sliding movement of the stop ring 32 to the left as viewed in FIG. 3 on cylinder 12.

Figure 7:
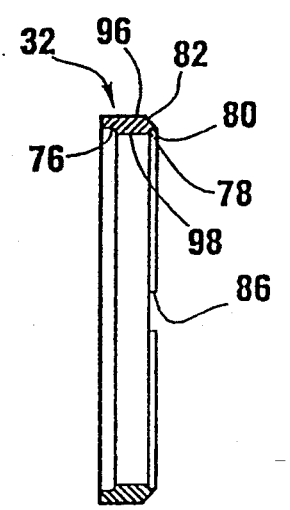
FIG. 7 is a sectional view taken along lines 7—7 of FIG. 6.
Figure 6:
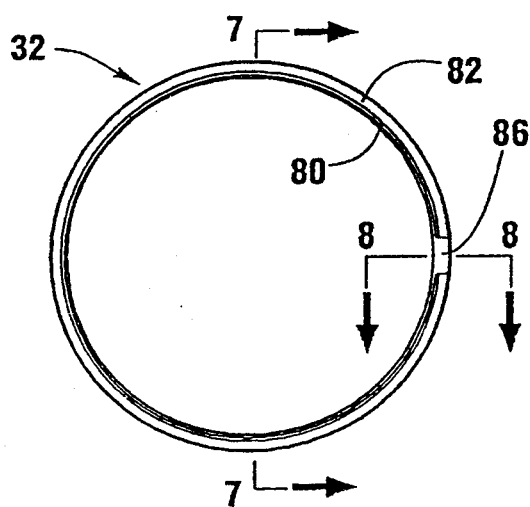
FIG. 6 is an elevational view of the locking ring used in the present invention.
Figure 8:
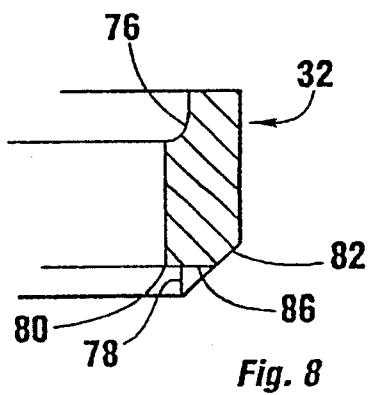
FIG. 8 is an enlarged sectional view taken along line 8—8 of FIG. 6.

The structure of the stop ring 32 is shown in FIGS. 6, 7, and 8 and is the same as the construction of the other stop rings 44 and 56. Stop ring 32 is circular in construction having an outer diameter 96 and an inner diameter 98 extending inwardly from one of the axial ends of stop ring 32 is a counterbore 78 which terminates in its inner end at an annular shoulder 80. Shoulder 80 faces axially to the right as shown in FIG. 7 and faces axially away from the ring seating groove 76. Adjacent the opening of the counterbore 78 is a chamfered edge 82 which joins the outer diameter 96. An access slot 86 is provided in the counterbore 78 so as to provide access from the exterior of ring 32 to the interior of the counterbore 78.

The stop ring 32 is assembled to the inner cylinder 12 by first placing the retaining snap ring 74 in the annular first groove 70. Then the stop ring 32 is slipped over the exterior surface of the first cylinder 12 and is moved into abutting engagement with the retaining snap ring 74 so that the retaining snap ring 74 fits within the ring seating groove 76 of stop ring 32.

Figure 4:
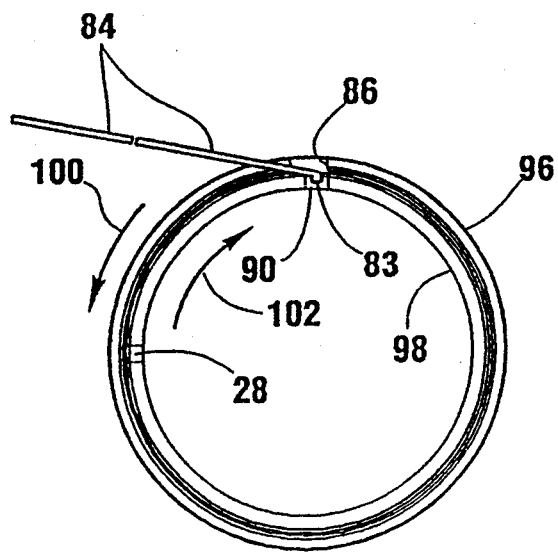
FIG. 4 is a sectional view taken along line 4—4 of FIG. 3 and showing the entire tube and stop ring.
Figure 5:
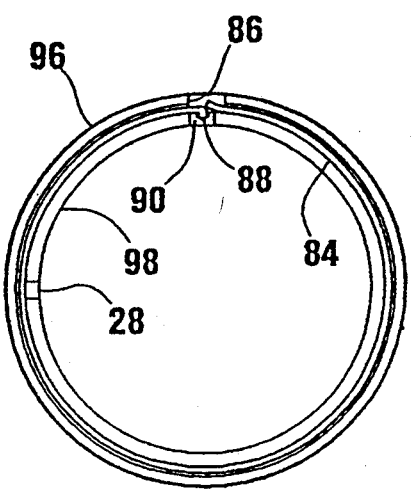
FIG. 5 is a sectional view similar to FIG. 4 showing the wire lock completely inserted into the groove of the inner cylindrical member and the counterbore of the outer cylindrical member.

A wire lock 84 includes a hook end 88 at one end thereof. The hook end 88 is inserted into a wire hole 90 which is provided in the bottom of second groove 72. As can be seen in FIG. 4, the wire lock 84 is initially straight in configuration, and extends through the slot 86 into the wire hole 90. The stop ring 32 is then rotated in a counterclockwise direction with respect to the cylinder 12 as shown by arrows 100, 102 in FIG. 4. This causes the wire lock 84 to be bent into a circular configuration and to be drawn into the annular groove 72 to the configuration shown in FIG. 5. The two opposite ends of the wire lock 84 are located at the slot 86. In this configuration the wire lock 84 protrudes radially outwardly beyond the outer cylindrical surface of first cylinder 12 and fits within the counterbore 78. The annular shoulder 80 at the inner end of counterbore 78 engages the wire lock 84 and prevents the stop ring 32 from moving to the right as viewed in FIG. 3 away from the retaining snap ring 74. Thus the stop ring 32 is held in place on the outer surface of the first cylinder 12. The stop rings 44, 56 are identical in construction with the stop ring 32 and are mounted in the same manner.

A mounting collar 92 is attached to the outer surface of the outer fourth cylinder 18 and includes a pair of oppositely extending pivot pins 94 for mounting the cylinder assembly 10 for use in a mechanical implement.

The above assembly of stop rings to the tubular stages or cylinders within a telescopic cylinder permits the assembly without the use of welding. Welding causes distortion of cylinders, and therefore the present invention provides a far better way to attach the stop rings then in prior welding processes. By using the present invention, when repair is needed, the parts may be disassembled and reground, rechromed, and repolished on centerless equipment since there is no distortion caused by welding.

The present concept can be used on the edge of any part such as a piston for a larger or smaller bore single stage cylinder. One important feature of the present invention is that the stop ring 84 is accessible from one axial end of the ring. To disassemble the stop ring 32 from the first cylinder 12 all that is necessary is to gain access to the ends of the wire lock 84 through the slot 86 and to pull the wire lock out of the slot. This is made easier by virtue of the fact that the wire lock 84 is partially visible and is partially accessbile through the open end of the counterbore 78, even when the stop ring 32 is assembled to the first cylinder 12.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing form the spirit or scope of the invention as further defined in the following claims.

What is claimed is:

1. A method for attaching an outer cylindrical member to an inner cylindrical member, said inner cylindrical member having an outer cylindrical surface with first and second axially spaced apart annular grooves formed therein, said first annular groove having a wire hole formed therein;

said outer cylindrical member having an outer diameter surface, an inner diameter surface sized to slide upon said outer cylindrical surface of said inner cylindrical member, a first axial end and a second axial end, said first axial end having a counterbore extending axially inwardly therefrom and terminating in an annular shoulder facing away from said second axial end of said outer cylindrical member, a slot extending axially inwardly from said first axial end and providing communication from the outside to the inside of said counterbore;

said method comprising:
inserting a retaining ring into said second groove with a first portion of said retaining ring being within said second groove and with a second portion of said retaining ring protruding radially outwardly beyond said cylindrical surface of said inner cylindrical member;

sliding said inner diameter surface of said outer cylindrical member over said cylindrical surface of said inner cylindrical member until said first axial end engages said second portion of said retaining ring, said counterbore and said slot being registered over said first annular groove of said inner cylindrical member;

inserting the first end of a wire through said slot and into said wire hole of said first annular groove;

rotating said outer cylindrical member relative to said inner cylindrical member whereby said wire will be pulled into said first annular groove and will protrude at least partially into said counterbore to limit axial movement of said outer cylindrical member away from said retaining wire in said second annular groove.

2. In combination:

an elongated inner cylindrical member having an outer cylindrical surface having first and second axially spaced apart annular grooves formed therein, said first groove having a wire hole formed therein and extending radially inwardly into said inner cylindrical member;

a retaining ring fitted within said second groove and having an outer circumferential portion protruding radially outwardly beyond said cylindrical surface of said inner cylindrical member;

an outer cylindrical member having an outer diameter surface and having an inner diameter surface surrounding said cylindrical surface of said inner cylindrical member for longitudinal sliding movement thereon, said outer cylindrical member having first and second axial ends, said first axial end abutting against said outer circumferential portion of said retaining ring;

said second axial end of said outer cylindrical member having a counterbore extending axially inwardly therefrom and terminating in an annular shoulder facing axially away from said first axial end of said outer cylindrical member, said counterbore being registered with said second annular groove in said inner cylindrical member;

said outer cylindrical member having a slot extending axially inwardly from said second end thereof and providing communication from said outer diameter surface to said counterbore;

a retaining wire having a first end protruding within said wire hole in said inner cylindrical member, said retaining wire extending within and around said second annular groove of said inner cylindrical member and said counterbore of said outer cylindrical member and abutting against said annular shoulder within said counterbore to limit axial movement of said outer cylindrical member away from said first annular groove of said inner cylindrical member.

3. In combination:

a first cylinder having a first cylinder bore extending therethrough; a second cylinder telescopically inserted within said first cylinder bore for longitudinal movement between a retracted position and an extended position, said second cylinder having an outer diameter surface spaced radially inwardly from said first cylinder to create an annular space therebetween;

said second cylinder having first and second axially spaced apart annular grooves in said outer diameter surface thereof and a radial wire hole within said second groove;

a retaining ring fitted within said first groove of said second cylinder and having an outer circumferential portion protruding radially outwardly beyond said outer diameter surface of said second cylinder;

a stop ring fitted within said annular space between said first and second cylinders and having an inner annular stop ring surface surrounding and slideably mounted over said outer diameter surface of said second cylinder;

said stop ring having a first axial end abutting said retaining ring in said first groove and having a second axial end with a counterbore extending axially inwardly therefrom and terminating in an annular shoulder facing axially away from said first axial end of said stop ring, said counterbore being registered with and overlying said second groove in said second cylinder;

said stop ring having a slot extending axially inwardly from said second end thereof and providing communication to said counterbore;

a retaining wire having a first end protruding within said wire hole and extending around and within said second annular groove of said second cylinder, a portion of said retaining wire abutting against said annular shoulder of said counterbore to limit axial movement of stop ring away from said first annular groove and said retaining ring.

* * * * *